UNITED STATES PATENT OFFICE.

THOMAS RIGBY, OF DUMFRIES, SCOTLAND, ASSIGNOR TO WETCARBONIZING LIMITED, OF LONDON, ENGLAND.

PEAT-DEWATERING PROCESS.

1,121,204. Specification of Letters Patent. Patented Dec. 15, 1914.

No Drawing. Application filed March 6, 1914. Serial No. 822,973.

*To all whom it may concern:*

Be it known that I, THOMAS RIGBY, a subject of the King of Great Britain and Ireland, of 61 Loreburn street, Dumfries, Scotland, have invented a certain new and useful Improved Peat-Dewatering Process, of which the following is a specification.

This invention relates to the treatment of peat by processes of heating while wet such as that known as wet-carbonization, having for their object the unbinding of the water so that the same can be pressed out of the peat afterward with relative ease. The practical application of such processes, however, which necessitates the employment of fairly high temperatures in order that the best results may be obtained, depends upon the most rigid heat economy in the process and consequently in most proposals for carrying out this process provision has been made for regenerating from the treated peat-mass heat which has been supplied to it.

Now I have recently observed that in order to obtain the full benefits of the unbinding of the peat water effected by the heat treatment the mass should be subjected to pressing or dewatering before it has become cooled too far and while still at as elevated a temperature as is convenient for working at and in order to enable this to be effected I have endeavored to cool the peat mass by regeneration only so far as is necessary to render it convenient for handling in filter presses, then to dewater it in filter presses and forthwith to return the hot liquor to heat regenerators and in this way apart from the easier dewatering obtained I have found substantial benefits in reduced power for pumping through the regenerators since instead of a peat mass which is gradually cooling and becoming much more viscous only simple hot water requires forcing through the regenerator passages. According to the present invention, however, I effect a considerable improvement even over this last proposal in that I admix the hot effluent to such an amount as is convenient directly with the raw peat mass passing through the heating zone so that the whole of heat units contained in the heat effluent added remain in the resultant mixture without the necessity for providing tubular or other heat regenerators for this portion of the heat recovery. Moreover, the effluent in this way acts to improve the conditions for the eventual reaction since certain matters which it contains have an accelerated reaction thereon and simultaneously tend to lessen the proportion of the nitrogen content of the peat-mass and of the solids of calorific value which pass into solution and are lost in the course of the treatment which secures unbinding of the water. The amount of the effluent which it is convenient to add in this way will depend largely upon the water content of the peat-mass as it reaches the installation and the water content which the peat-mass should have during treatment. Thus if the peat is being excavated from a well drained deposit containing say 87% of water and the amount of water which it should contain is well above 90% a large proportion of if not the whole of the effluent can be added directly to the peat-mass to give it the desired fluidity. At the same time even if the peat as it reaches the factory contains a large amount of water it may still be economical to add substantial quantities of hot effluent to it. In such circumstances it may be convenient after the admixture has taken place and the heat become distributed in the mixture to subject the peat to drainage or partial dewatering so that the excess of water is removed before the further heating operation. In carrying out the invention therefore in one way the hot peat-mass is cooled down by regeneration in the ordinary way until a temperature of say 70° C. at which it can be conveniently dealt with in filter presses into which it is then passed and the hot liquor leaving the presses at practically the same temperature is then passed in the desired quantity to mixing devices in which it is thoroughly incorporated with the cold raw peat passing to the inlet of the heaters.

As an instance of the influence of the re-use of the effluent on the preservation of the nitrogen contents of the peat I may instance two cases in which a peat wet-carbonized with water in the ordinary way lost 16.6% of its nitrogen but only 10% when wet-carbonized with effluent from previous treatment while another peat which normally lost 21% of its nitrogen only lost 14% when treated according to the improved method.

Having now described my invention, what I claim as new and desire to secure by Letters Patent is:—

1. A process for dewatering peat in which the peat is heated while wet to a relatively elevated temperature to render the water expressible, is dewatered by pressing while still at a fairly elevated temperature and hot liquid matter separated therefrom added to a quantity of raw peat about to be treated; as and for the purposes set forth.

2. A process for dewatering peat in which the peat while wet is heated to an elevated temperature without allowing evaporation, is cooled only sufficiently by heat transfer to a quantity of cooler peat to render it capable of being handled in pressing devices, is then dewatered without undue cooling and hot expressed liquid matter added to colder wet peat about to be treated; as set forth.

3. A process for dewatering peat in which the peat while wet is heated to a fairly elevated temperature without permitting evaporation, is dewatered before its temperature has fallen much more than to about 70° C. and hot liquid matter expressed from the peat admixed with cooler material awaiting treatment; as set forth.

4. A process for dewatering peat in which a wet peat mass is heated to a relatively elevated temperature while flowing continuously through heating elements without permitting evaporation, is dewatered while still at a fairly elevated temperature, and the hot liquid separated in dewatering added in sufficient quantity to raw peat awaiting treatment to give it the necessary fluidity to permit of its flowing continuously through the heating elements; as set forth.

In testimony whereof I have signed my name to this specification in the presence of two subscribing witnesses.

T. RIGBY.

Witnesses:
 BERTRAM H. MATTHEWS,
 H. DUNWORTH.

Copies of this patent may be obtained for five cents each, by addressing the "Commissioner of Patents, Washington, D. C."